US008235692B2

(12) United States Patent
Oneda et al.

(10) Patent No.: US 8,235,692 B2
(45) Date of Patent: Aug. 7, 2012

(54) NOZZLE STRUCTURE

(75) Inventors: Yoshitsugu Oneda, Kyoto (JP); Makoto Kubota, Kyoto (JP); Mitsutoshi Matsuno, Hyogo (JP); Toshitada Toyoda, Hyogo (JP); Chieko Imamoto, Hyogo (JP)

(73) Assignee: Kikusui Seisakusho Ltd., Kyoto-shi, Kyoto (JP)

( * ) Notice: Subject to any disclaimer, the term of this patent is extended or adjusted under 35 U.S.C. 154(b) by 147 days.

(21) Appl. No.: 12/448,162

(22) PCT Filed: Dec. 21, 2007

(86) PCT No.: PCT/JP2007/074653

§ 371 (c)(1),
(2), (4) Date: Jun. 11, 2009

(87) PCT Pub. No.: WO2008/081749

PCT Pub. Date: Jul. 10, 2008

(65) Prior Publication Data

US 2010/0021579 A1 Jan. 28, 2010

(30) Foreign Application Priority Data

Dec. 22, 2006 (JP) ................................ P2006-345899

(51) Int. Cl.
*B29C 33/60* (2006.01)
*B29C 43/28* (2006.01)

(52) U.S. Cl. ......................... 425/107; 425/218; 425/345

(58) Field of Classification Search .................... 425/96, 425/99, 100, 107, 215, 218, 345
See application file for complete search history.

(56) References Cited

U.S. PATENT DOCUMENTS

| | | | | |
|---|---|---|---|---|
| 3,558,052 | A * | 1/1971 | Dunn | 239/3 |
| 4,388,343 | A * | 6/1983 | Voss et al. | 425/107 |
| 5,017,122 | A * | 5/1991 | Staniforth | 425/100 |
| 6,884,054 | B2 * | 4/2005 | Shimada | 425/107 |
| 7,131,828 | B2 * | 11/2006 | Watanabe et al. | 425/100 |
| 7,690,906 | B2 * | 4/2010 | Tado et al. | 425/107 |

FOREIGN PATENT DOCUMENTS

| | | |
|---|---|---|
| JP | 2001-205493 | 7/2001 |
| WO | WO 03/051621 A1 | 6/2003 |
| WO | WO 2005/110726 A1 | 11/2005 |

* cited by examiner

*Primary Examiner* — Richard Crispino
*Assistant Examiner* — Thukhanh Nguyen
(74) *Attorney, Agent, or Firm* — McGinn IP Law Group, PLLC

(57) ABSTRACT

A nozzle structure is mounted in a compression molding machine that compresses using a punch a powder material filled in a die to manufacture a compressively molded product, and sprays a lubricant at least toward a tip of the punch prior to filling the powder material and includes a guide path that guides the lubricant, and a spraying portion that is provided at an end of the guide path so as to communicate therewith and that sprays the lubricant guided along the guide path so as to be substantially aligned with a predetermined straight line intersecting at least in a direction of relative displacement of the punch.

20 Claims, 7 Drawing Sheets

NOZZLE STRUCTURE

TECHNICAL FIELD

The present invention relates to a nozzle structure for use in a compression molding machine that compresses a powder material to mold a product such as a medical tablet and a food item.

BACKGROUND ART

As described in a Patent Document (International Publication No. WO 2005/110726 Pamphlet), a conventionally known rotary powder compression molding machine used for production of tablets includes a spray nozzle that sprays a powder lubricant so as to allow the powder lubricant to adhere to a punch and/or an inside of a die. In the rotary powder compression molding machine described in the Patent Document, the powder lubricant sprayed from the spray nozzle is charged electrostatically and differently so as to adhere to each of an upper punch, a lower punch and the die.

The spray nozzle for the powder lubricant has a concave portion formed of three-dimensional curved surface and an electrode projecting into the concave portion. The powder lubricant is supplied into the concave portion using a pressurized gas and is electrostatically charged in the concave portion by a direct voltage that is applied to the electrode then to be guided toward the upper punch or the like along the three-dimensional curved surface of the concave portion.

However, in such a configuration, the powder lubricant possibly adheres to regions other than a target region, resulting in deterioration in efficiency of the powder lubricant. Specifically, the powder lubricant is sprayed along the three-dimensional curved surface in the nozzle provided with the concave portion described above, so that the powder lubricant scatters into a relatively large area. Therefore, increased is a quantity of the powder lubricant which is sprayed but does not adhere to the target region, that is, which does not contribute to product molding, resulting in deterioration in efficiency of the powder lubricant.

DISCLOSURE OF THE INVENTION

It is therefore an object of the present invention to solve the above defect.

Specifically, a nozzle structure according to the present invention sprays a lubricant at least toward a tip of a punch prior to filling a powder material in a compression molding machine that compresses using the punch the powder material filled in a die to manufacture a compressively molded product, and the nozzle structure includes: a guide path that guides the lubricant; and a spraying portion that is provided at an end of the guide path so as to communicate therewith, and that sprays the lubricant guided along the guide path so as to be substantially aligned with a predetermined straight line intersecting at least in a direction of relative displacement of the punch.

In the above configuration, the spraying portion sprays the lubricant toward the punch, which is being relatively displaced, so as to be substantially aligned with the straight line. Thus decreased, in comparison with a case of radially spraying the lubricant, is a quantity of the lubricant that does not adhere at least to the punch. Accordingly, it is possible to improve efficiency of the lubricant.

The lubricant in the present invention inhibit, upon compressively molding a tablet in a powder compression molding machine, a powder medical material from adhering to an inside of the die as well as to tips of upper and lower punches. Specific examples of the lubricant, particularly the powder lubricant, include stearic acids, stearates (metal salts of Al, K, Na, Ca, Mg and the like) and water-shedding substances such as sodium lauryl sulfate.

In order to broaden utility regardless of the shape of the compressively molded product, the spraying portion is preferably formed of a groove that has a width smaller than a width of the tip of the punch and a length greater than a length of the tip of the punch, and a through hole that is opened substantially at a center of a bottom surface of the groove and allows the groove and the guide path to communicate with each other.

For easier production, preferably, the guide path is provided in a path main body, and the spraying portion is provided to a plate body that is detachably attached to the path main body.

In order to have the lubricant effectively adhere to a target region, preferably there is further included electric field generation means that charges the lubricant sprayed near the spraying portion. In order to efficiently charge the lubricant using the electric field generation means, the electric field generation means may include an electrode that has an end exposed into the guide path near the spraying portion.

The compression molding machine applying the present invention preferably includes: a frame; an upright shaft that is provided rotatably in the frame; a turret that is mounted to the upright shaft; a plurality of dies each that are provided with a die hole and are attached to the turret at a predetermined interval in a circumferential direction thereof, upper punches and lower punches that are disposed so as to allow tips thereof to be inserted into the die holes of the dies from upwards and downwards, respectively; and an upper roll and a lower roll that compress the powder material filled in the die holes when the upper punches and the lower punches pass therebetween with the tips thereof being inserted into the die holes, respectively.

In order to improve adhesion accuracy of the lubricant to the upper punches and the lower punches in the above rotary powder compression molding machine, preferably, the path main body includes a first guide path and a second guide path that are formed substantially in parallel with each other in the path main body, a first plate body provided with a first spraying portion that sprays the lubricant toward the upper punches, is detachably attached to the path main body so as to correspond to the first guide path, a second plate body provided with a second spraying portion that sprays the lubricant at least toward the lower punches, is detachably attached to the path main body so as to correspond to the second guide path, and the electric field generation means includes a first electrode having an end exposed into the guide path near the first spraying portion, and a second electrode having an end exposed into the guide path near the second spraying portion.

In the above described configuration according to the present invention, in comparison with the case of radially spraying the lubricant, decreased is the quantity of the lubricant that does not adhere at least to the punches. Therefore, it is possible to improve efficiency of the lubricant.

BEST MODE FOR CARRYING OUT THE INVENTION

Described below with reference to the drawings is an embodiment of the present invention.

The embodiment described below is applied to a rotary powder compression molding machine.

Figure 1:
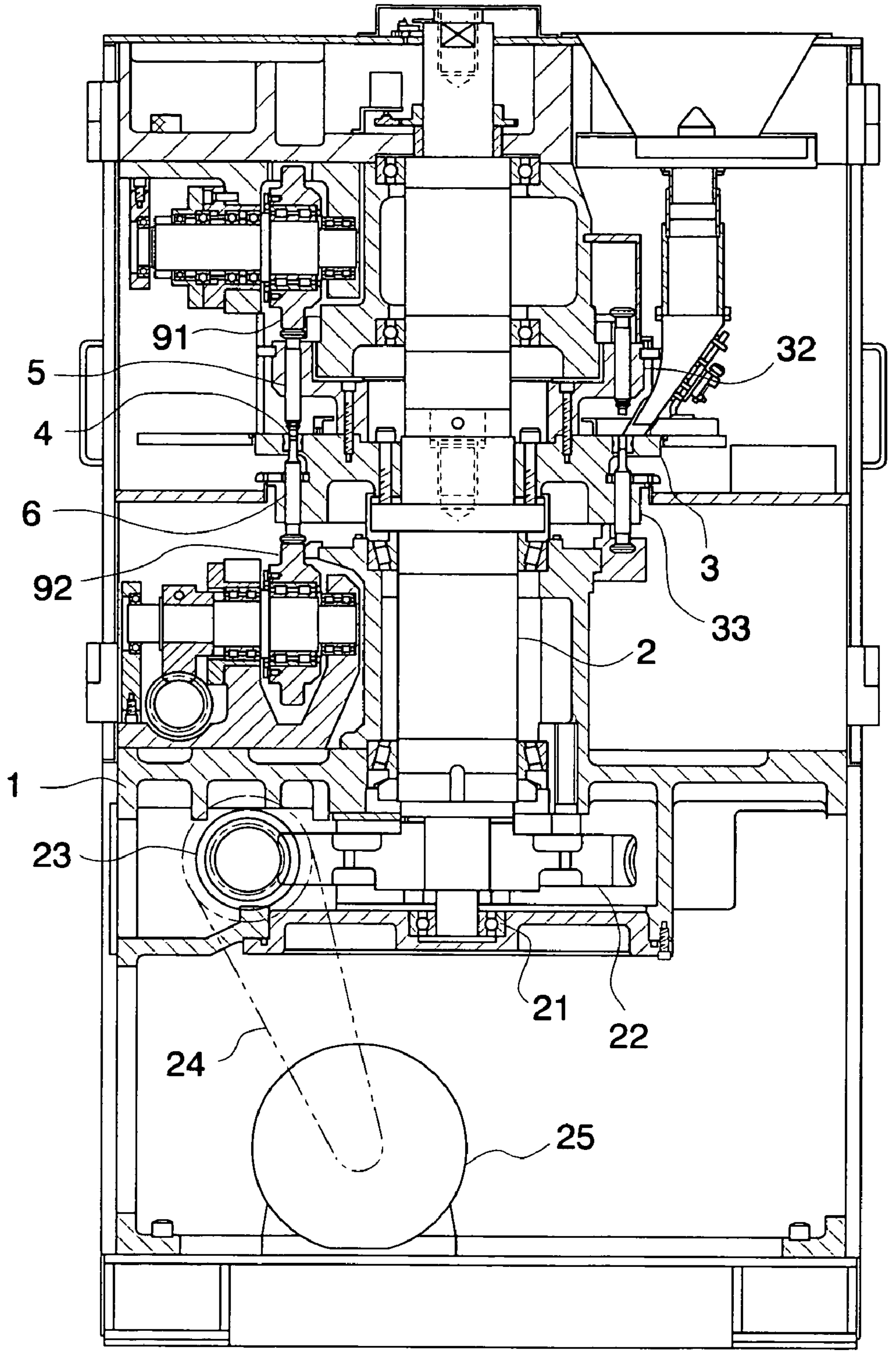
FIG. 1 is a cross sectional view of a rotary powder compression molding machine including a nozzle structure according to an embodiment of the present invention.

As shown in FIG. 1, the rotary powder compression molding machine includes a frame 1, an upright shaft 2 that is provided rotatably in the frame 1, a turret 3 that is mounted to the upright shaft 2, a plurality of dies 4 each that have a die hole 41 and are attached to the turret 3 at a predetermined interval in a circumferential direction thereof, upper punches 5 and lower punches 6 that are disposed to allow tips thereof to be inserted into the die holes of the dies 4 from upwards and downwards, respectively, and upper rolls 91 and 93 as well as lower rolls 92 and 94 that compress a powder material filled in each of the die holes 41 when the upper punches 5 and the lower punches 6 pass therebetween with the tips thereof being inserted into the die holes 41, respectively. The rotary powder compression molding machine further includes a nozzle structure 7 that has a nozzle portion and is disposed on an upper side of the turret 3.

The upright shaft 2 is rotatably supported by a bearing 21, which is supported by the frame 1. There is fixed a worm wheel 22 in the vicinity of a lower end of the upright shaft 2. The upright shaft 2 is rotated when a drive force of a motor 25 is transmitted to the worm wheel 22 by way of a worm 23 and a belt 24.

The turret 3 is mounted to the upright shaft 2 and has a circular plate shape in planar view. The turret 3 includes an upper punch retaining portion 32 in an upper portion thereof, and a die portion 33 beneath the upper punch retaining portion 32. The upper punch retaining portion 32 retains the plurality of upper punches 5 so as to be vertically slidable, and is provided with punch retaining holes of the number corresponding to the number of the upper punches 5 at a predetermined interval in the circumferential direction. The punch retaining holes retains the upper punches 5 respectively. The die portion 33 retains the lower punches 6 so as to be vertically slidable using punch retaining holes of the number corresponding to the number of the lower punches 6 provided at the predetermined interval in the circumferential direction. The die portion 33 has a plurality of die mounting holes provided at a predetermined interval in the circumferential direction so as to correspond to the positions of the upper punches 5 and the lower punches 6 thus retained. The dies 4 are detachably mounted in the die mounting holes, respectively.

Figure 2:
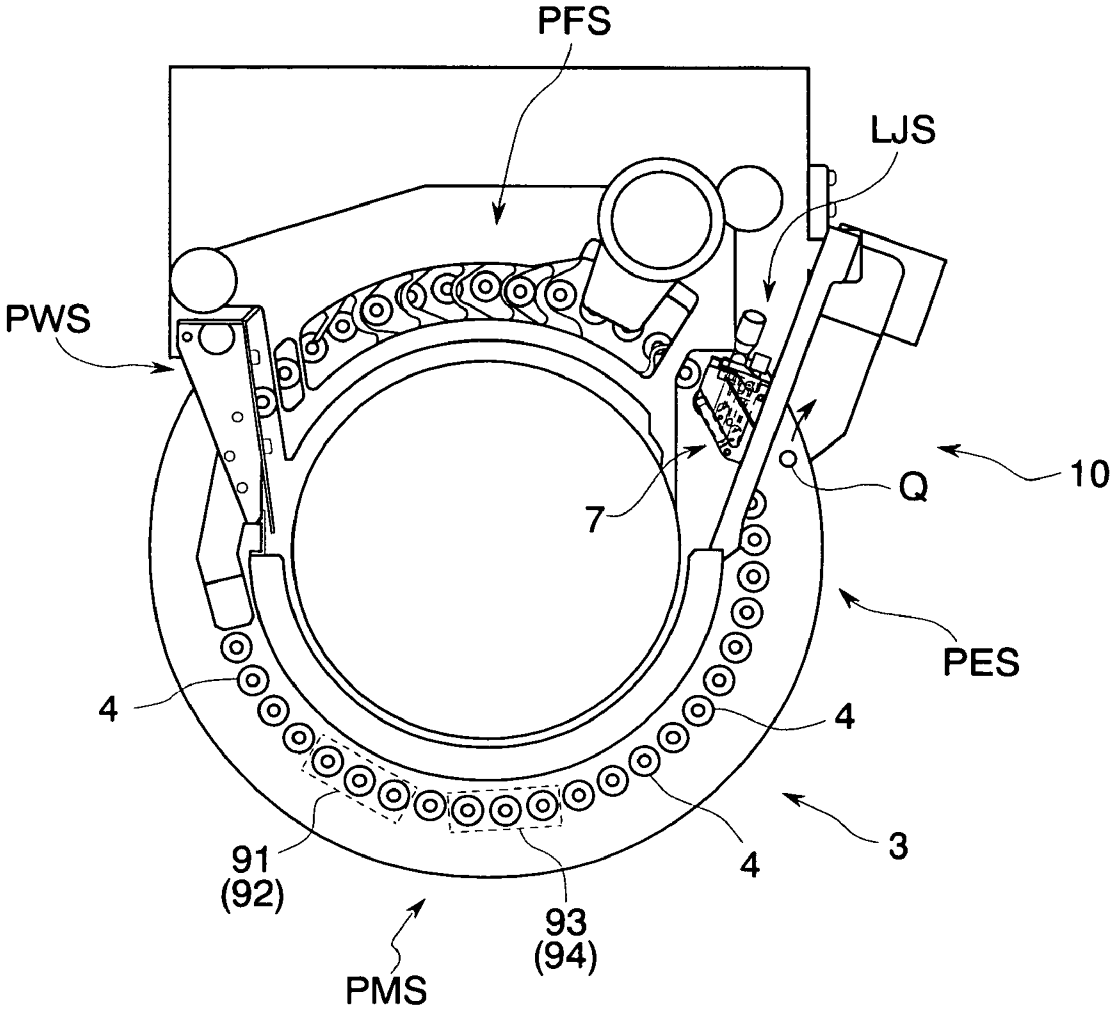
FIG. 2 is a plan view of functional sections on an upper side of a turret according to the embodiment.
Figure 3:
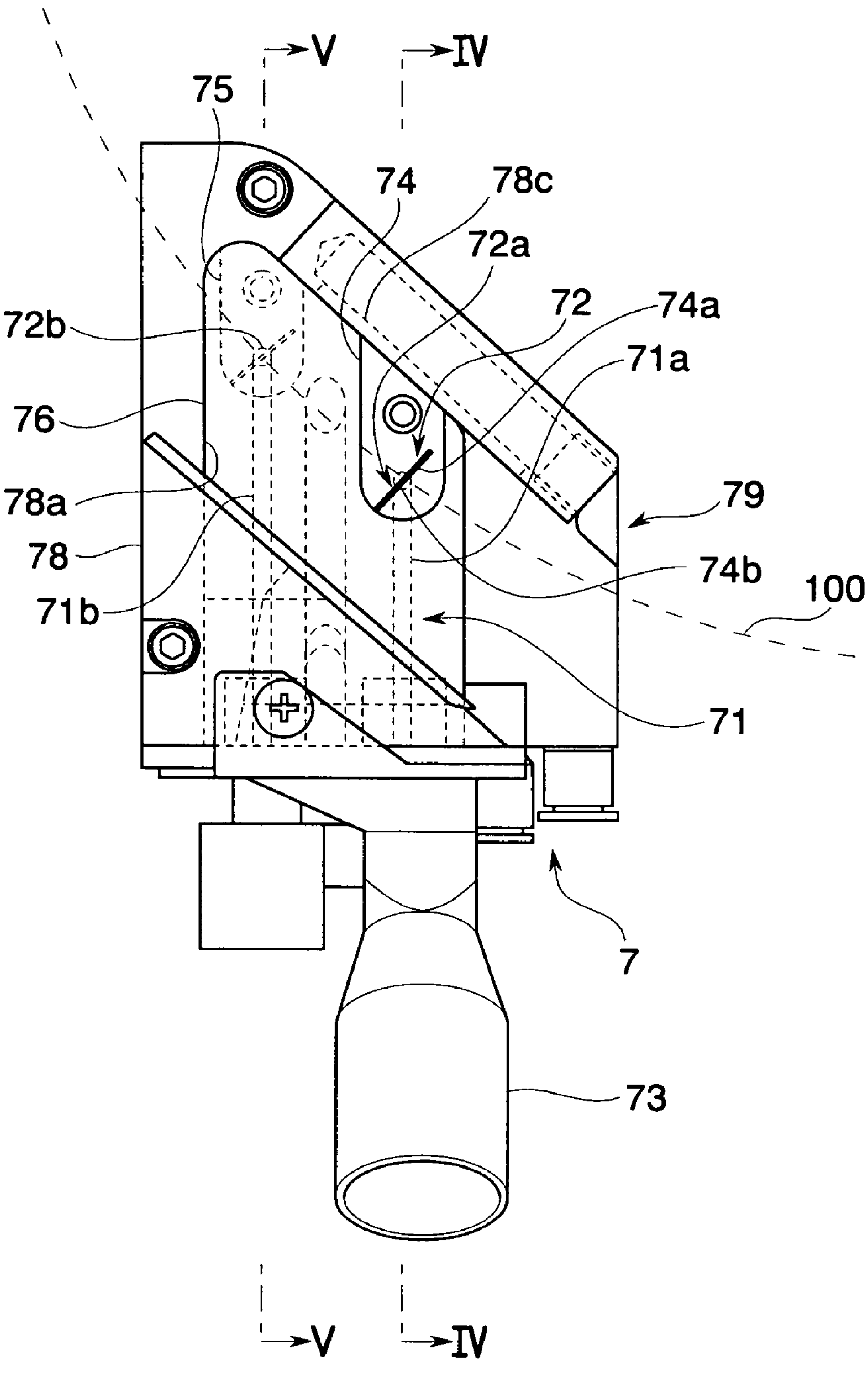
FIG. 3 is a plan view according to the embodiment.
Figure 4:
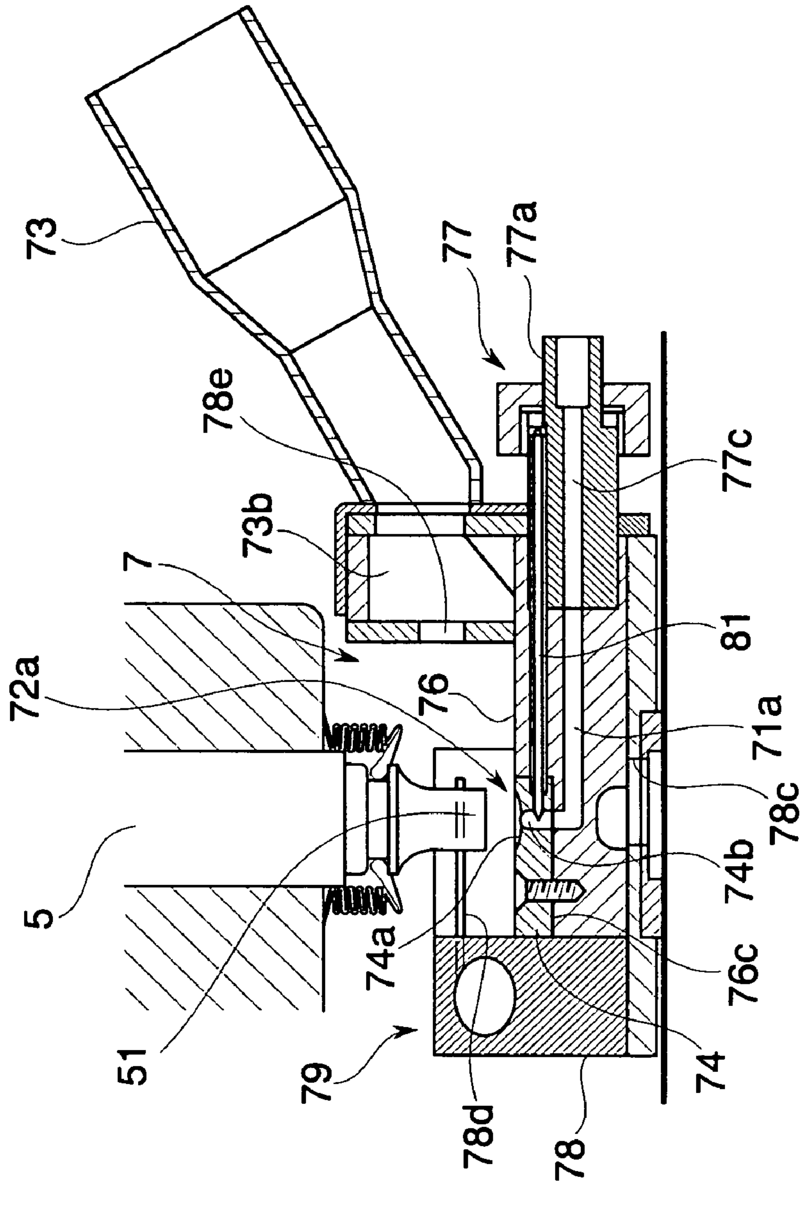
FIG. 4 is a cross sectional view cut along Line IV-IV indicated in FIG. 3.
Figure 5:
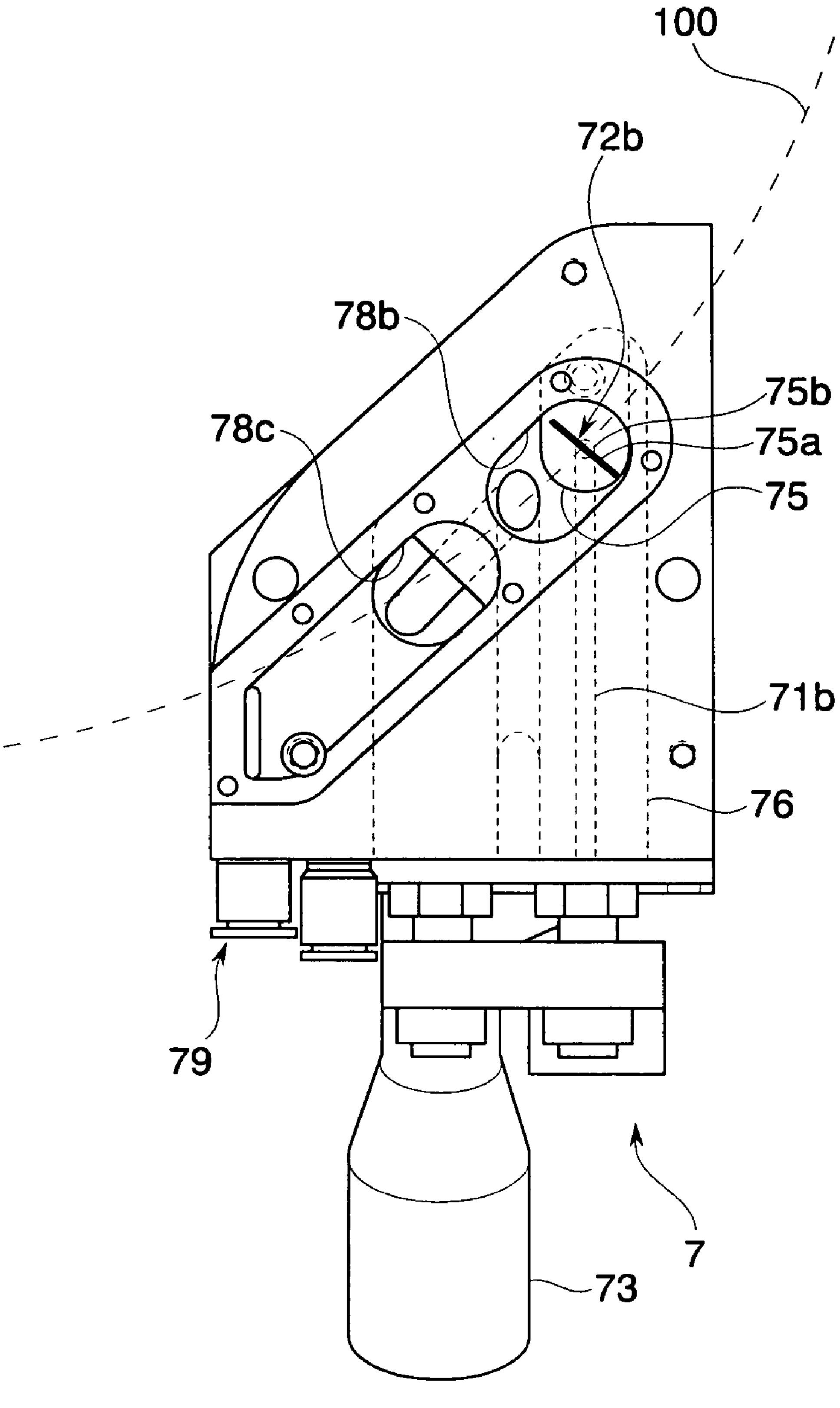
FIG. 5 is a bottom view of the nozzle structure according to the embodiment.
Figure 6:
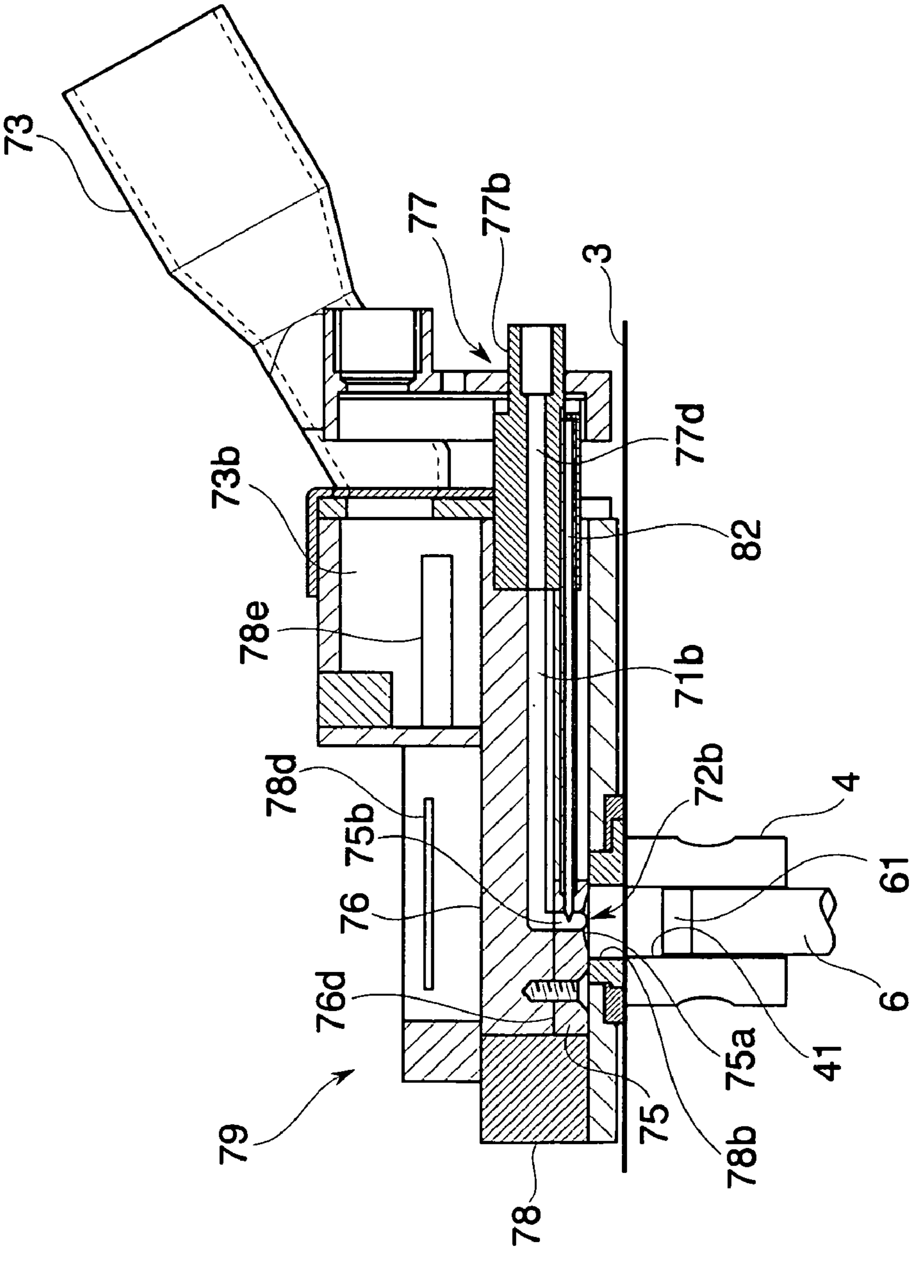
FIG. 6 is a cross sectional view cut along Line V-V indicated in FIG. 3.

In the rotary powder compression molding machine configured as described above, a surface of the turret 3 can be sectioned in accordance with functions. As shown in FIG. 2, the surface of the turret 3 is provided with a powder filling section PFS, a powder leveling section PWS, a compression molding section PMS, a product ejecting section PES, and a lubricant spraying section LJS, sequentially along the direction of rotation of the turret 3. These sections each are described below.

In the powder filling section PFS, the powder material for products Q is filled substantially evenly into the respective dies 4 sequentially with the lower punches 6 being descended to the lowest position. During this process, the upper punches 5 are retained at a high position so as not to disturb the operation of filling the powder material.

In the powder leveling section PWS, the lower punches 6 are ascended to a predetermined position set for each type of the products Q so that the quantity of the powder material filled in each of the dies 4 is made equal to a quantity required for manufacturing the product Q. As a result, the powder material that overflows out of the dies 4 is removed from the turret 3 so that the quantities of the powder material filled in the respective dies 4 are made substantially the same. The upper punches 5 are retained at a high position also in the powder leveling section PWS as in the powder filling section PFS.

In the compression molding section PMS, after the upper punches 5 having been descended to the position of starting compression, the upper punches 5 and the lower punches 6 are made to pass between the upper and lower pre-compression rolls 91 and 92 so as to preliminarily compress the powder material filled in the dies 4. Then, the upper punches 5 and the lower punches 6 retained at the position of passing between the upper and lower pre-compression rolls 91 and 92 are made to pass between the upper and lower main compression rolls 93 and 94 so as to further compress the powder material that has already been preliminarily compressed.

In the product ejecting section PES, the upper punches 5 are ascended to pull the tips thereof out of the dies 4, respectively, and the lower punches 6 are then ascended to push the products Q out of the dies 4. The pushed out products Q are conveyed at an ejecting position by the turret 3 and collected.

In the lubricant spraying section LJS, the upper punches 5 are descended until the tips thereof are positioned below an air outlet 78*d* of a nozzle assembly 79, while the lower punches 6 are descended to the position of starting filling the powder material. In other words, the upper punches 5 are descended to a position of minimizing the distance between the tips thereof and a first spraying portion 72*a*, while the lower punches 6 are lowered to a position where a powder lubricant adheres to portions expected to be in contact with the powder material, namely, entire inner walls of the dies 4 as well as the tips of the lower punches 6.

In the respective sections described above, the upper punches 5 and the lower punches 6 are ascended or descended using any type of a rail and a cam employed in a conventional rotary powder compression molding machine. Therefore, the rail and the cam are neither described in detail nor shown in the drawings herein.

As shown in FIGS. 3 to 6, the nozzle structure 7 includes guide paths 71 that guide the powder lubricant, spraying portions 72 that are provided at ends of the guide paths 71 respectively so as to communicate therewith, and spray the powder lubricant guided along the guide paths 71 so as to be substantially aligned with a predetermined straight line intersecting at least with the direction of relative displacement of the upper punches 5 and the lower punches 6, and electric field generation means 8 that charges the powder lubricant sprayed in the vicinity of the spraying portions 72. In the nozzle structure 7 according to the present embodiment, the nozzle assembly 79 is configured by a first plate body 74 that is provided with the first spraying portion 72*a*, a second plate body 75 that is provided with a second spraying portion 72*b*, a path main body 76 that is provided with the guide paths 71, connecting pipes 77 that communicate with the guide paths 71, and a housing 78 that supports the path main body 76. The nozzle assembly 79 is mounted with a first electrode 81 and a second electrode 82 that configure the electric field generation means 8. It is possible to employ a direct high voltage supply device such as that disclosed in the above Patent Document, wherein the direct high voltage supply device configures the electric field generation means 8 and supplies each of the first electrode 81 and the second electrode 82 with a direct high voltage.

The path main body 76 is a thick and substantially flat plate made of fluorocarbon resin or the like. Formed in a solid core of the path main body 76 are a first guide path 71*a* and a second guide path 71*b* substantially in parallel with each other so as not to change relative positions therebetween. Although the path main body 76 may not be necessarily solid in the core thereof, the first guide path 71*a* and the second guide path 71*b* need to be formed therein immovably as well as independently from each other. The path main body 76 further includes electrode mounting holes that are each provided substantially in parallel with corresponding one of the guide paths 71 and that allow the first electrode 81 and the second electrode 82 to be inserted thereinto independently from each other.

The first guide path 71*a* guides the powder lubricant to the first plate body 74 such that the powder lubricant is sprayed toward the upper punches 5. The first guide path 71*a* is thus formed substantially in parallel with an upper surface of the path main body 76 and is then redirected upwards to be substantially vertical at the end thereof. On the other hand, the second guide path 71*b* guides the powder lubricant to the second plate body 75 such that the powder lubricant is sprayed toward the lower punches 6 as well as toward the inside of the dies 4, namely, the inner wall surfaces of the die holes 41. The second guide path 71*b* is thus formed substantially in parallel with a lower surface of the path main body 76 and is then redirected downwards to be substantially vertical at the end thereof. The path main body 76 has a first concave portion 76*c* and a second concave portion 76*d* provided on the upper and lower surfaces at regions corresponding to the ends of the first guide path 71*a* and the second guide path 71*b*, respectively, so as to comply with the configurations of the guide paths 71*a* and 71*b*. Attached into the first concave portion 76*c* and the second concave portion 76*d* are the first plate body 74 and the second plate body 75 that configure the spraying portions 72.

There are provided connecting pipes 77*a* and 77*b* that connect supply conduits of a powder lubricant supply device to the guide paths 71*a* and 71*b*, respectively. The connecting pipes 77*a* and 77*b* are each made of fluorocarbon resin or the like similarly to the path main body 76, and each have a bar shape in which connecting paths 77*c* and 77*d* are formed to have inner diameters substantially equal to those of the first and second guide paths 71*a* and 71*b*, respectively. The first and second guide paths 71*a* and 71*b* are connected with the connecting paths 77*c* and 77*d*, respectively, by inserting the connecting pipes 77*a* and 77*b* into mounting holes that are provided in the path main body 76 so as to have central axes identical to those of the guide paths 71*a* and 71*b*. Male screws are formed at outer ends of the connecting pipes 77*a* and 77*b*, respectively, that are used for connecting the supply conduits therewith. Further provided in the connecting pipes 77*a* and 77*b* so as to be substantially in parallel with the connecting paths 77*c* and 77*d* are through holes that allow the first and second electrodes 81 and 82, which configure the electric field generation means 8, to pass therethrough respectively.

It may be able to adopt a powder lubricant supply device widely known in this art. Specifically, a device according to the above Patent Document can be exemplified, which continuously feeds a small quantity of a powder lubricant such as 5 to 25 g per hour to the guide paths 71*a* and 71*b*, respectively. In order to feed the powder lubricant at a predetermined rate, a feed rate thereof is optically detected according to the low-angle light diffusion system or is electrically detected according to the electrostatic capacitance system or the like, so as to calculate a difference between the quantity of supplied powder lubricant based on the detected feed rate and the quantity of the powder lubricant that does not adhere but is retrieved. The quantity of the supplied powder lubricant is then feedback controlled according to the calculation result so as to feed the powder lubricant at the predetermined rate.

The first plate body 74 and the second plate body 75 are detachably attached, using screws, into the first concave portion 76*c* and the second concave portion 76*d* in the path main body 76. The first plate body 74 is provided with the first spraying portion 72*a* while the second plate body 75 is provided with the second spraying portion 72*b*. The first spraying portion 72*a* has a shape identical to that of the second spraying portion 72*b*, and the first spraying portion 72*a* and the second spraying portion 72*b* are each provided on a surface substantially aligned with the surface (the upper surface or the lower surface) of the path main body 76 when mounted. The first spraying portion 72*a* and the second spraying portion 72*b* are configured by grooves 74*a* and 75*a* and through holes 74*b* and 75*b*, respectively.

The grooves 74*a* and 75*a* have widths smaller than those of tips 51 and 61 of the upper punches 5 and lower punches 6, and have lengths greater than those of the tips 51 and 61 of the upper punches 5 and lower punches 6. The grooves 74*a* and 75*a* may each have a deepest portion at the center thereof and each form an opening in the surface of the plate body 74 or 75. The grooves 74*a* and 75*a* each have a depth made gradually smaller from the center thereof. The grooves 74*a* and 75*a* are formed in the plate bodies 74 and 75, respectively, such that the nozzle structure 7 mounted to the frame 1 has a longitudinal direction substantially perpendicular to a trajectory 100 of the centers of the dies 4.

The through holes 74*b* and 75*b* communicate with the insides of the grooves 74*a* and 75*a*, respectively. The through holes 74*b* and 75*b* penetrate into the grooves 74*a* and 75*a* from the surfaces opposite to the surfaces provided with the grooves 74*a* and 75*a*, respectively, that is, from the surfaces in contact with bottom surfaces of the first and second concave portions 76*c* and 76*d*. The through holes 74*b* and 75*b* have inner diameters substantially equal to those of the first and second guide paths 71*a* and 71*b*, and are formed to communicate with the first and second guide paths 71*a* and 71*b* in a case where the first and second plate bodies 74 and 75 are attached into the concave portions 76*c* and 76*d*. There are formed electrode holes, which allow the first and second electrodes 81 and 82 to pass therethrough, so as to be perpendicular to the central axes of the through holes 74*b* and 75*b*. When the nozzle assembly 79 is build up, exposed to the through holes 74*b* and 75*b* are the ends of the first and second electrodes 81 and 82 that pass through the electrode holes.

The housing 78 is used for attaching the path main body 76 to the frame 1, and hollows in the substantial center thereof such that the path main body 76 is partially exposed from a hollow portion 78*a*. Specifically, the housing 78 is a plate body made of fluorocarbon resin and is thicker than the path main body 76. The hollow portion 78*a* is opened on the upper surface of the housing 78 into a substantially parallelogram shape in planar view. The housing 78 is provided on the lower surface thereof with a spray opening 78*b* and a retrieval opening 78*c*. The spray opening 78*b* is provided at a region corresponding to the second spraying portion 72*b* of the second plate body 75, and the retrieval opening 78*c* has a half oval shape and is provided at a region in the vicinity of as well as apart from the spray opening 78*b*. There is no limitation in the shape to the opening of the hollow portion 78*a* on the upper surface of the housing 78 as long as the first spraying portion 72*a* is entirely exposed when the path main body 76 is inserted from an opening formed on a side surface of the housing 78 into the hollow portion 78*a* in the housing 78. Further, the shape of the retrieval opening 78*c* is not limited as long as the retrieval opening 78*c* is used for retrieving the powder lubricant sprayed out of the spray opening 78*b* onto the turret 3 and is positioned behind the turret 3 in the direction of rotation thereof.

An air outlet 78*d* and an air inlet 78*e* are positioned such that the upper opening of the hollow portion 78*a* in the housing 78 is interposed between the air outlet 78*d* and the air inlet 78*e*. The air outlet 78*d* is used for forming an air curtain that prevents the powder lubricant being sprayed from the first spraying portion 72*a* but not adhering to the upper punches 5 from scattering above the lower ends of the upper punches 5. In a state where the path main body 76 is incorporated in the housing 78, the air outlet 78*d* extends in both directions from the first spraying portion 72*a* substantially as a center thereof and is opened substantially in parallel with the upper surface of the housing 78 in planar view. At the position where the powder lubricant is made to adhere to the upper punches 5, the air outlet 78*d* is provided such that the air curtain is formed above the lower ends of the upper punches 5. The air inlet 78*e* is provided so as to face the air outlet 78*d*, and sucks the excess powder lubricant floating between the air curtain and the upper surface of the housing 78. The air inlet 78*e* is an opening wider than the air outlet 78*d* and is provided substantially as high as or slightly higher than the air outlet 78*d*.

The powder lubricant sucked from the retrieval opening 78*c* and the air inlet 78*e* is retrieved into a dust pickup device (not shown) by way of a dust pickup conduit 73. As described above, the housing 78 is provided with a retrieval path 73*b* that allows the powder lubricant retrieved through the retrieval opening 78*c* and the air inlet 78*e* to pass therethrough.

Figure 7:
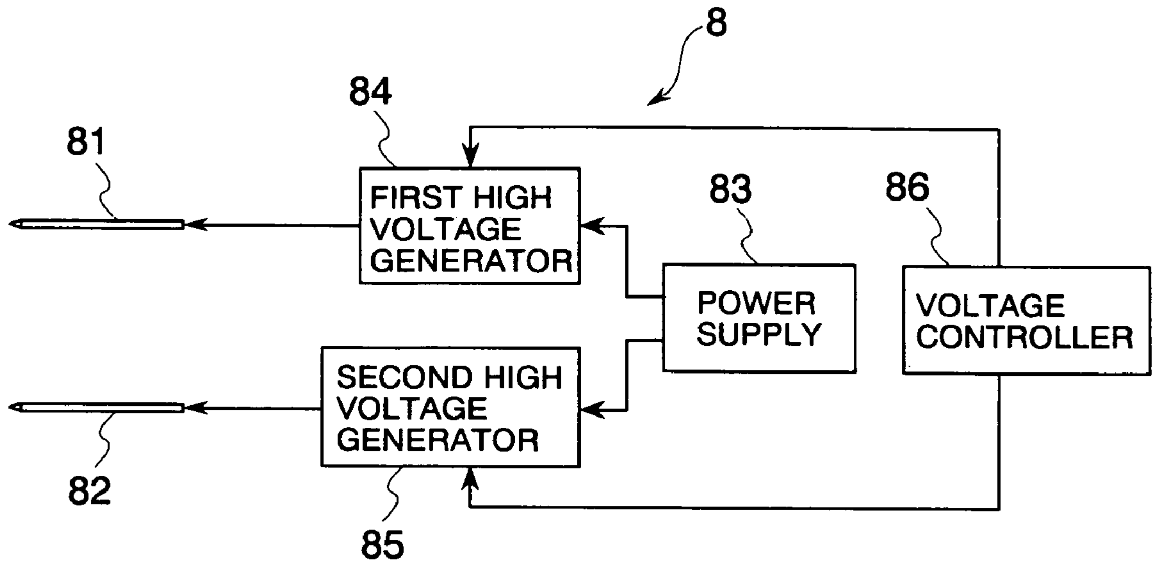
FIG. 7 is a block diagram showing a configuration of electric field generation means according to the embodiment.

As shown in FIG. 7, the electric field generation means 8 includes the first electrode 81 and the second electrode 82 described above, as well as a power supply 83, a first high voltage generator 84, a second high voltage generator 85, and a voltage controller 86. The power supply 83 generates a direct voltage. Each of the first high voltage generator 84 and the second high voltage generator 85 is electrically connected to the power supply 83 and converts the direct voltage outputted from the power supply 83 into a high voltage. The voltage controller 86 controls voltage values outputted from the first high voltage generator 84 and the second high voltage generator 85 independently from each other. Applied to the first electrode 81 and the second electrode 82 are negative direct high voltages, namely, a first direct high voltage and a second direct high voltage, each that are outputted from the first high voltage generator 84 and the second high voltage generator 85 and are controlled by the voltage controller 86. On the other hand, a positive direct high voltage is applied to the frame 1 that is maintained at a reference potential. As the frame 1 is maintained at the reference potential, that is, is grounded, also grounded are the upper and lower punches 5 and 6 as well as the dies 4 to which the powder lubricant adheres.

The first direct high voltage outputted from the first high voltage generator 84 and the second direct high voltage outputted from the second high voltage generator 85 have output voltage values different from each other. The first direct high voltage is set to have the voltage value lower than that of the second direct high voltage. The powder lubricant sprayed from the first spraying portion 72*a* adheres to only the tips of the upper punches 5, while the powder lubricant sprayed from the second spraying portion 72*b* is required to adhere to the tips of the lower punches 6 as well as to the inner peripheral walls of the dies 4. Thus, the powder lubricant is electrostatically charged by setting the voltage value of the second direct high voltage to be higher than that of the first direct high voltage, so as to increase the quantity of the powder lubricant adhering to the relevant parts. The first high voltage generator 84 and the second high voltage generator 85 may be controlled by the voltage controller 86 in a manner similar to that of the above Patent Document.

As shown in FIG. 2, in this configuration, the nozzle assembly 79 is mounted at a position between the powder filling section PFS and the product ejecting section PES in the rotary powder compression molding machine. At this position, the nozzle assembly 79 is mounted in the vicinity of the turret 3 with the lower surface of the housing 78 being partially in contact with the upper surface of the turret 3 in the lubricant spraying section LJS. In this case, the nozzle assembly 79 is mounted such that the centers of the through holes 74*b* and 75*b* of the respective first and second spraying portions 72*a* and 72*b* are aligned with an extended line of the trajectory 100 of the centers of the dies 4. After the nozzle assembly 79 is mounted to the frame 1, the powder lubricant supply conduits are connected to the connecting pipes 77*a* and 77*b*, respectively. Further, connected to a connecting end that is provided to the nozzle assembly 79 is an air supply conduit that supplies high pressure air forming an air curtain.

When the rotary powder compression molding machine is in operation, the powder lubricant is supplied to the nozzle assembly 79 and the electric field generation means 8 forms an electric field. The powder lubricant is conveyed through each of the connecting pipes 77*a* and 77*b* by an airflow, and reaches the through holes 74*b* and 75*b* of the spraying portions 72*a* and 72*b* by way of the guide paths 71*a* and 71*b*, respectively. The powder lubricant is electrostatically charged while passing through the through holes 74*b* and 75*b* and scatters in the grooves 74*a* and 75*a*, respectively. The grooves 74*a* and 75*a* each have a width smaller than the diameter of the tip 51 of the upper punch 5 or the like. The grooves 74*a* and 75*a* each have a length greater than the length of the tip 51 of the upper punch 5. Accordingly, the powder lubricant is sprayed from the spraying portions 72*a* and 72*b* toward the upper punches 5, the lower punches 6, and the die holes 41, respectively, not in a circular shape but substantially in a straight line shape.

In such a state where the powder lubricant is continuously sprayed from the respective spraying portions 72*a* and 72*b*, the lower end surfaces of the upper punches 5, the upper end surfaces of the lower punches 6, and the die holes 41 pass through the area into which the powder lubricant is sprayed. The powder lubricant is sprayed in the straight line shape, through which the upper punches 5, the lower punches 6, and the die holes 41 pass, so that the powder lubricant is regarded to be sprayed entirely to the lower end surfaces of the upper punches 5, the upper end surfaces of the lower punches 6, and the inner peripheral surfaces of the die holes 41. The electrostatically charged powder lubricant is attracted to and adheres substantially evenly to the upper punches 5, the lower punches 6, and the die holes 41 each that are electrostatically charged to maintain at the reference potential. As there is an electrostatic attractive force working between the powder lubricant and the adhering surfaces in the state where the powder lubricant adheres thereto, the powder lubricant does not easily fall off the adhering surfaces. In the present embodiment, the path main body 76 is provided with the first guide path 71*a* and the second guide path 71*b*, and the first guide path 71*a* and the second guide path 71*b* are made to communicate with the first spraying portion 72*a* and the second spraying portion 72*b*, respectively. In this configuration, there occurs no relative displacement between the first spraying portion 72*a* and the second spraying portion 72*b*. In a case where a conventional nozzle in a bar shape is mounted, the powder lubricant is sometimes sprayed in a direction different from a set direction depending on its mounted state. However, in the present embodiment, the path main body 76 is formed of a thick plate body as well as the first spraying portion 72*a* and the second spraying portion 72*b* are each provided as a plate body, so as to prevent such a conventional problem. The powder lubricant is therefore allowed to securely adhere to the upper punches 5, the lower punches 6, and the insides of the dies 4.

Moreover, as described above, the grooves 74*a* and 75*a* of the first and second spraying portions 72*a* and 72*b* inhibit the powder lubricant from scattering radially in planar view around the outlets of the through holes 74*b* and 75*b*. In comparison with a conventional nozzle, decreased is the quantity of the powder lubricant that does not adhere but is retrieved, so that improved is efficiency of the powder lubricant. In addition, the powder lubricant sprayed in the straight line shape is made to adhere to the desired regions since the upper punches 5, the lower punches 6, and the dies 4 are displaced with respect to the nozzle assembly 79. Even in a case where the punch tips each have a shape such as a circular shape, an elliptical shape, or an oval shape, that is, even in a case where the shapes of the products Q are changed, the powder lubricant is allowed to adhere to each of such various shapes using the spraying portions having a uniform shape. Furthermore, the present embodiment adopts the configuration in which the guide paths 71*a* and 71*b* are detachable from the corresponding spraying portions 72*a* and 72*b*, respectively. Therefore, it is possible to easily detach the respective spraying portions 72*a* and 72*b* and to prepare spraying portions 72*a* and 72*b* having shapes corresponding to the above various shapes of the products.

Below described are results of evaluation tests on adhesion of a powder lubricant employing magnesium stearate in the rotary powder compression molding machine configured as described above. It is quite difficult to directly measure quantities of the powder lubricant adhering to the upper and lower punches 5 and 6 as well as to the dies 4. Thus, in the adhesion evaluation tests, the products Q were continuously molded for a predetermined period, specifically for five hours, to evaluate degrees of adhesion based on the quantity of the powder lubricant adhering to the products Q during this period.

Upon an adhesion evaluation test, in the rotary powder compression molding machine (hereinafter, referred to as the present machine), a rotational speed of the turret 3 was set to 40 rpm (rotation/minute), an air volume for spraying the powder lubricant was set to 12 l/min (liter/minute), a purge air volume for sucking the powder lubricant was set to 12 l/min, an exhaust pressure was set to 500 Pa (Pascal), and 10 g of the powder lubricant was supplied to the nozzle structure 7 per one hour. It should be noted that no voltage was applied to the first electrode 81 or the second electrode 82 in this adhesion evaluation test. For the purpose of comparison, another adhesion evaluation test was performed under the conditions same as described above with use of the rotary powder compression molding machine described in International Publication No. WO 2005/110726 Pamphlet (hereinafter, referred to as a comparative machine).

Firstly, in a normal operation of molding a powder material into the products Q with the powder lubricant being sprayed, the products Q were ejected every one hour to measure the quantity of the powder lubricant adhering to the ejected products Q. As a result, each of the products Q had the powder lubricant contained therein of a weight equal to 0.01% of one of the products Q. The same result was obtained with the comparative machine.

Described next are adhesion evaluation tests in which a voltage is applied to the first electrode 81 and the second electrode 82 so as to change the adhesion conditions. Measured in these adhesion evaluation tests were the quantities of the powder lubricant contained in each of the products in cases where the applied voltages were set to 20 kV and 40 kV, respectively. Then, in the present machine, the quantities of the powder lubricant contained in each of the products were both 0.04% in both of the cases with 20 kV and 40 kV. On the other hand, with the comparative machine, in the case where the voltage of 20 kV was applied to the electrodes to be charged in order to electrostatically charge the powder lubricant, the quantity of the powder lubricant contained in each of the products was 0.01%, and the quantity was increased to 0.03% in the case of raising the voltage up to 40 kV.

These results prove that the present machine increases adhesion efficiency with the same voltage set.

Described in the above embodiment is the configuration inclusive of the electric field generation means 8 that electrostatically charges the powder lubricant. However, the electric field generation means 8 may not be included, that is, an electrostatically uncharged powder lubricant may be sprayed. Upon adopting this configuration in the above embodiment, no electrode mounting hole is obviously required in the path main body 76.

Further, described in the above embodiment is the configuration in which the guide paths 71*a* and 71*b* each are formed in the solid core of the path main body 76 and the path main body 76 is mounted with the plate bodies 74 and 75 having the spraying portions 72*a* and 72*b* provided thereto, respectively. Alternatively, the nozzles may be formed independently from each other as in the above Patent Document. Specifically, in order to configure one nozzle, a guide path may be formed in a bar or cylindrical member, and a plate body formed with a spraying portion may be mounted onto an end of the member.

In the above embodiment, there is described the air outlet 78*d* that is used for forming an air curtain. Alternatively, there may be provided an additional air outlet at a predetermined position below the air outlet 78*d* in order to inhibit the sprayed powder lubricant from scattering in the lateral direction. Specifically, there may be provided a pair of short air outlets each that are opened along the upper surface of the housing 78, so that air curtains are formed on the opposite sides of the width of the groove 74*a* of the first spraying portion 72*a*. Further alternatively, openings of a width substantially same as that of the air outlet 78*d* may be formed from the opposite ends of the air outlet 78*d* downwards to reach the upper surface of the housing 78.

Correspondingly to the air outlets configured to form the air curtains, in order to suck the excess powder lubricant and thus to increase the retrieval rate thereof, there may be provided another air inlet in addition to the air inlet 78*e* described above. Specifically, such an air inlet may be formed so as to be paired with the additional air outlet described above.

Other specific configurations in the respective portions are not limited to the above embodiment, but various modifications are applicable without departing from the objects of the present invention.

INDUSTRIAL APPLICABILITY

Described above is an example in which the present invention is applied in a rotary powder compression molding machine. The present invention is also applicable to any powder compression molding machine that is not of a rotary type but is configured to displace upper and lower punches as well as dies relatively to a nozzle assembly in a nozzle structure.

The invention claimed is:

1. A nozzle structure for spraying a lubricant at least toward a tip of a punch prior to filling a powder material in a compression molding machine that compresses, using the punch, the powder material filled into dies to manufacture a compressively molded product, the nozzle structure comprising:

a guide path that guides the lubricant;

a spraying portion that is provided above an uppermost surface of the guide path so as to communicate therewith, and that sprays the lubricant guided along the guide path so as to be substantially aligned with a predetermined straight line intersecting at least in a direction of a relative displacement of the punch, the spraying portion comprising a groove whose longitudinal direction is formed substantially perpendicular to a trajectory of centers of the dies;

a through hole that inflects from the uppermost surface of the guide path perpendicular to a direction of an extension of the guide path to connect a bottom surface of the groove to the uppermost surface of the guide path; and an electrode comprising a tip portion exposed inside the through hole, said tip portion of the electrode being located below the bottom surface of the groove and above the uppermost surface of the guide path.

2. The nozzle structure according to claim 1, wherein the groove has a width smaller than a width of the tip of the punch and a length greater than a length of the tip of the punch, and wherein the through hole is opened substantially at a center of the bottom surface of the groove and allows the groove and the guide path to communicate with each other.

3. The nozzle structure according to claim 1, wherein the guide path is provided in a path main body, and the spraying portion is provided in a plate body that is detachably attached to the path main body.

4. The nozzle structure according to claim 1, further comprising electric field generation means that charges the lubricant sprayed near the spraying portion.

5. The nozzle structure according to claim 4, wherein the electric field generation means includes the electrode that comprises the tip portion, the tip portion being exposed near the spraying portion.

6. The nozzle structure according to claim 1, wherein the compression molding machine includes:

a frame;

an upright shaft that is provided rotatably in the frame;

a turret that is mounted on the upright shaft;

a plurality of dies, each provided with a die hole and attached to the turret at a predetermined interval in a circumferential direction thereof, and upper punches and lower punches that are disposed to allow tips thereof to be inserted into the die holes of the dies from upwards and downwards, respectively; and an upper roll and a lower roll that compress the powder material filled into the die holes when the upper punches and the lower punches pass therebetween with the tips thereof being inserted into the die holes, respectively.

7. The nozzle structure according to claim 5, wherein the path main body includes a first guide path and a second guide path that are formed substantially in parallel with each other in the path main body, wherein a first plate body provided with a first spraying portion that sprays the lubricant toward an upper punch is detachably attached to the path main body so as to correspond to the first guide path, wherein a second plate body provided with a second spraying portion that sprays the lubricant at least toward a lower punch that is detachably attached to the path main body to correspond to the second guide path, and wherein the electric field generation means includes the electrode having the tip portion exposed near the first spraying portion, and a second electrode having an end exposed near the second spraying portion.

8. The nozzle structure according to claim 2, further comprising electric field generation means that charges the lubricant sprayed near the spraying portion.

9. The nozzle structure according to claim 8, wherein the electric field generation means includes the tip portion of the electrode exposed near the spraying portion.

10. The nozzle structure according to claim 1, wherein the groove has a width smaller than a width of the tip of the punch and a length greater than a length of the tip of the punch.

11. The nozzle structure according to claim 1, wherein the groove has a decreasing diameter such that the groove has a deepest portion at a center thereof.

12. The nozzle structure according to claim 1, further comprising another spraying portion including another groove, said spraying portion and said another spraying portion comprising through holes that respectively penetrate into a bottom surface of the groove and said another groove.

13. The nozzle structure according to claim 12, wherein centers of the through holes are aligned with an extended line of the trajectory of the centers of the dies.

14. The nozzle structure according to claim 1, wherein the through hole penetrates into the bottom surface of the groove to connect the groove to the guide path.

15. The nozzle structure according to claim 14, wherein the through hole has an inner diameter substantially equal to an inner diameter of the guide path.

16. The nozzle structure according to claim 1, wherein the groove has a width that is less than a diameter of the tip of the punch, and a length that is more than a length of the tip of the punch.

17. The nozzle structure according to claim 1, wherein an end portion of the through hole is connected to a center of the groove, and wherein a depth of the groove gradually reduces from the center to sides of the groove such that the groove has a deepest portion at the center.

18. The nozzle structure according to claim 1, wherein the electrode passes through the through hole perpendicular to a central axes of the through hole and parallel to the direction of the extension of the guide path, in which the guide path guides the lubricant.

19. A nozzle structure for spraying a lubricant toward a punch prior to filling a powder material in a compression molding machine that compresses, using the punch, the powder material filled into dies to manufacture a compressively molded product, the nozzle structure comprising;

a guide path that guides the lubricant;

a spraying portion that is provided below a bottom surface of the guide path so as to communicate therewith, and that sprays the lubricant guided along the guide path so as to be substantially aligned with a predetermined straight line intersecting at least in a direction of a relative displacement of the punch, the spraying portion comprising a groove whose longitudinal direction is formed substantially perpendicular to a trajectory of centers of the dies;

a through hole that inflects from the bottom surface of the guide path perpendicular to a direction of an extension of the guide path to connect an upper surface of the groove to the bottom surface of the guide path; and an electrode comprising a tip portion exposed inside the through hole, said tip portion of the electrode being located above the upper surface of the groove and below the bottom surface of the guide path, wherein the nozzle structure sprays the lubricant downward toward the punch and die holes of said dies.

20. A nozzle structure for spraying a lubricant at least toward a punch prior to filling a powder material in a compression molding machine that compresses, using the punch, the powder material filled into dies to manufacture a compressively molded product, the nozzle structure comprising:

a guide path that guides the lubricant;

a spraying portion that sprays the lubricant guided along the guide path so as to be substantially aligned with a predetermined straight line intersecting at least in a direction of a relative displacement of the punch, the spraying portion comprising a groove whose longitudinal direction is formed substantially perpendicular to a trajectory of centers of the dies;

a through hole that inflects from the guide path perpendicular to a direction of an extension of the guide path to connect an end surface of the groove to an end surface of the guide path; and an electrode comprising a tip portion exposed inside the through hole, said tip portion of the electrode being located between the end surface of the groove and the end surface of the guide path.

* * * * *